United States Patent [19]

Lee et al.

[11] Patent Number: 4,522,951

[45] Date of Patent: * Jun. 11, 1985

[54] REMOVAL OF MG++ AND CA++ IONS FROM NaCl BRINE

[75] Inventors: John M. Lee; William C. Bauman, both of Lake Jackson, Tex.

[73] Assignee: The Dow Chemical Company, Midland, Mich.

[*] Notice: The portion of the term of this patent subsequent to Sep. 20, 2000 has been disclaimed.

[21] Appl. No.: 533,682

[22] Filed: Sep. 19, 1983

Related U.S. Application Data

[63] Continuation of Ser. No. 307,827, Oct. 2, 1981, Pat. No. 4,405,574.

[51] Int. Cl.³ .................. C08D 5/20; G01N 31/04
[52] U.S. Cl. ............................... 521/28; 436/79; 210/687; 204/98
[58] Field of Search .......................... 521/28; 436/79

[56] References Cited

U.S. PATENT DOCUMENTS

| | | | |
|---|---|---|---|
| 3,041,292 | 6/1962 | Hatch | 521/28 |
| 3,346,422 | 10/1967 | Berger | 521/28 |
| 3,352,800 | 11/1967 | Smith et al. | 521/28 |
| 3,920,397 | 11/1975 | Small et al. | 436/79 |
| 3,925,019 | 12/1975 | Small et al. | 436/79 |

OTHER PUBLICATIONS

Chem. Abstracts, vol. 92, 1980 entries 83071x and 83073z.
Strelow et al., Analytical Chem. vol. 46, No. 11, Sep. 1974, pp. 1409-1414.
Singh et al., Ion-Exchange Symposium, Bhavnagar, India 1978, Part I, pp. 138-146.

*Primary Examiner*—Joseph L. Schofer
*Assistant Examiner*—Peter F. Kulkosky
*Attorney, Agent, or Firm*—W. J. Lee

[57] ABSTRACT

Alkaline earth metal ions, e.g., $Mg^{++}$ and/or $Ca^{++}$, are removed from alkali metal brines, e.g., NaCl, by use of a particulate, macroporous, anion exchange resin containing the in-situ reaction product of polymeric, amorphous, hydrous zirconium oxide and a source of $PO_4^{---}$ ions, e.g., $H_3PO_4$.

19 Claims, No Drawings ns from NaCl brine.

REMOVAL OF MG++ AND CA++ IONS FROM NaCl BRINE

This is a continuation of application Ser. No. 307,827, filed Oct. 2, 1981, now U.S. Pat. No. 4,405,574.

BACKGROUND OF THE INVENTION

Various alkali metal halide aqueous solutions e.g., NaCl brine, contain Mg++ ions and/or Ca++ ions which are considered detrimental if the aqueous solution is intended for use in certain applications, such as in an electrolytic process. These are commercial incentives to substantially removing the Mg++ and/or Ca++.

It is known that hydrous zirconium oxide and other zirconium compounds, such as zirconium phosphates, are useful as inorganic ion exchangers.

SUMMARY OF THE INVENTION

An amorphous polymeric zirconium hydrous oxide is formed within the resin beads of a macroporous anion exchange resin, then treated with $PO_4^{---}$ to form $ZrO(xPO_4)$, thereby forming novel ion exchange composite structures which are useful in removing alkaline earths ($Mg^{++}$ and/or $Ca^{++}$) ions from alkali metal halide brines.

DETAILED DESCRIPTION

It is known that zirconium hydroxide is prepared by alkali precipitation of an aqueous solution of a zirconyl salt. For the present invention it is preferred that the alkali be ammonia since it is more easily washed out than the alkali metal hydroxides or alkaline earth metal hydroxides. Precipitation at cold (ambient) temperature gives a gelatinous product which is substantially $Zr(OH)_4$ containing about 26.5% water or more. A partially dehydrated zirconyl hydroxide, $ZrO(OH)_2$, results from drying it at elevated temperature (e.g., 100° C.), or from hot-precipitation (e.g., 85° C.) followed by hot drying.

Thus, in the present invention the expression "hydrous zirconium oxide" has within the purview of its meaning any of the various amorphous hydrated forms of zirconium oxide which are substantially or largely insoluble in water.

The macroporous anion exchange resin is one which contains anion functionality groups. Such resins are available commercially, such as polymers of styrene crosslinked with divinylbenzene having amine groups attached thereto. For instance a macroporous anion exchange resin with tertiary amine groups affixed to a styrene-divinylbenzene resin structure is sold by The Dow Chemical Company under the tradename DOWEX MWA-1. It is within the purview of the present invention to use any macroporous anion exchange resin.

In general, the polymeric zirconium hydrous oxide is formed within the resin beads by wetting the resin with an aqueous solution of a soluble zirconium or zirconyl compound, such as $ZrOCl_2 \cdot 8H_2O$. If excessive zirconium or zirconyl solution is present, it should be drained off and the resin substantially dried, such as by air-drying. The dried resin, containing the zirconium or zirconyl compound is alkalized or neutralized, preferably by use of $NH_4OH$, thereby forming polymeric $ZrO(OH)_2$. Excess $NH_4OH$ and $NH_4Cl$ (which forms) is washed out, such as by repeated contact with water or NaCl brine. The composite is acidified with $H_3PO_4$ thereby forming $ZrO(xPO_4)$, where x is about 0.2 to about 2.

In the general process outlined above, the beginning zirconyl compound may be hydrated $ZrOCl_2$ or the like, such as $Zr(NO_3)_4$, $ZrOBr_2$, $ZrOI_2$, or $Zr(SO_4)_2$, or any such water-soluble zirconium compound which will precipitate to form $ZrO(OH)_2$ when contacted with a base, especially $NH_4OH$. The so-formed $ZrO(OH)_2$, also called "zirconium hydrous oxide", is an amorphous, polymeric structure. Following the above alkalizing step, the $PO_4^{---}$ used for forming the $ZrO(xPO_4)$ is preferably $H_3PO_4$, but may also be any alkali metal acid phosphate, e.g., $NaH_2PO_4$ and the like.

Once the $ZrO(xPO_4)$ has been formed, the composite is ready to take on alkaline earth metal values from brine. This is done, for example, by placing the composite in a vessel, preferably a column, and passing alkaline earth metal-containing NaCl brine through the composite until the composite is substantially "loaded" with alkaline earth metal values and is ready for another water-washing.

It is within the purview of this invention that the metal salt brine may be a natural brine, such as seawater or mineral brine, a LiCl brine, a KCl brine, or an alkali metal salt brine which comes from an ore dressing, ore leaching, mineral dressing, and the like. The present novel composite exhibits a high affinity for, and a strong preference for, $Mg^{++}$ and/or $Ca^{++}$ ions. It is also useful as chromatographic packing for $Ca^{++}$, $Mg^{++}$ analysis.

The product is preferably an amorphous polymeric hydrous zirconium oxide formed within the resin beads of a macroporous anion exchange resin having ionizable anion groups, such as tertiary amine groups, wherein the hydrous oxide is at least partially neutralized (reacted) with $PO_4^{---}$, such as $H_3PO_4$. The resin is effective for exchanging alkaline earth metal ions (especially $Mg^{++}$ and/or $Ca^{++}$) from NaCl brine at alkaline pH.

It is preferred that maximum loading of the hydrous oxide into the resin be attained, or at least approached. The upper limits are those imposed by the amount of zirconium compound which the resin can imbibe; likewise for the phosphorous to zirconium ratio. It should be noted that macroporous resin is expected to imbibe much more of the zirconium and phosphorous compounds than a gel-type resin.

Using commercially available macroporous resin, a resin composite containing about 1.47 moles of Zr/cc is readily obtained as per Example 1 which follows; a phosphorous/zirconium ratio of 0.297 in this resin is obtained and is operable.

Theoretically the P/Zr ratio in crystalline zirconyl phosphate could be as high as 2/1, but in practice is difficult to approach. However, the maximum P/Zr ratio which one might expect to prepare from amorphous polymeric hydrous zirconium oxide is believed to be about 1.6/1. Operability is attained throughout the ranges preferred in accordance with the present invention, but since the capacity for $Ca^{++}$ and/or $Mg^{++}$ are directly related to the P content, then the highest practical P/Zr ratio is preferred.

An important operating variable, in using the present composite to remove alkaline earth metal values from an alkali metal brine, is the pH of the brine. This $ZrO(xPO_4)$-containing resin composition is stable to acidic solutions, e.g., 1N HCl, in contrast to the hydrous Zr oxide resin composition. At a caustic concentration above about 0.1N the Zr/P is partially soluble. The pH of the brine, as measured by glass electrode, is preferably in the range of about 5 to about 8.5. The $Ca^{++}$ and/or $Mg^{++}$ is best stripped by flowing 1N acid through the column, followed by 0.1N acid. Regeneration to alkaline pH is best accomplished by batch treatment with alkali to pH 11, but avoiding pH substantially above 11. For column operation, treatment of the resin with caustic of 0.1N or less is recommended.

A flow rate of about 0.01–0.08 bed volume per minute at about 50°–60° C. is preferred for the brine, though flow rates in the range of 0.001 to 0.2 bed volumes per minute at temperatures from about 20°–100° C. are operable.

By use of the present invention, greater than 99% of the $Ca^{++}$ and/or $Mg^{++0}$ are removed from 15 bed volumes of 26% brine containing about 0.7 gm. $Ca^{++}$ and/or $Mg^{++}$ per liter.

The following example is intended to illustrate an embodiment of the present invention, but the invention is not limited to the particular embodiment shown.

EXAMPLE 1

Here, there is used a macroporous anion exchange resin with tertiary amine groups affixed to a styrene-divinylbenzene resin structure. The resin is in the amine chloride salt form and is a commercial resin sold by The Dow Chemical Company under the tradename of DOWEX MWA-1-Cl$^-$. About 34 gms of this resin is wetted with a solution of about 30 gms $ZrOCl_2 \cdot 4H_2O$ in 40 gms $H_2O$. The resin absorbed all the solution and became free-flowing. The air-dried resin is added to solution of 30 ml of 30% aqueous $NH_3$ and 10 ml $H_2O$. The temperature rose to 40° C. The excess $NH_4OH$, external $Zr(OH)_4$ and the $NH_4Cl$ (which formed) are washed out by repeated contact with excess water. The washed resin was added to 40 gm. of conc. $H_3PO_4$ in 100 gm $H_2O$ (pH=1.0), then added 21 gm of $CaCl_2 \cdot 2H_2O$ and neutralized with 30% $NH_3$ with warming. With 40 ml of 30% $NH_3$ added, the pH=7.0 at 70° C. The resin was then washed with raw brine (26% NaCl, 681 ppm $Ca^{++}$), the final pH was 6.7 in 26% NaCl by glass electrode. The product was 115 cc of resin composite. X-ray diffraction analysis revealed no crystallinity.

The resin prepared was placed with 26% NaCl brine in a temperature controlled jacketed column. Brine was started at 3.3 ml/min. and 75° C. The first 50 cc through was discarded. We then collected 50 cc cuts. No $Ca^{++}$ was found in the brine effluent; the rate was increased to 10 cc/min. After 250 cc of brine, there was still no $Ca^{++}$ in effluent. Diluted 15 ml of 36% HCl to 300 ml and pumped through at 10 ml/min. Noted high strength $CaCl_2$ effluent, pH 6, still after 300 ml of HCl solution. Then followed with 0.1N HCl at 10 ml/min.; acid broke through after 50 ml. For 100 ml effluent, pH 1.7, there was very high $Ca^{++}$. After 1000 ml of 0.1N HCl, we switched flow to 0.1N NaOH at 21 cc/min. After 300 ml, effluent pH 1.3 contained no $Ca^{++}$. The 0.1N NaOH was continued for 1000 ml, at which time the effluent pH was 3; then flow of 200 ml of $H_2O$, and back to brine. After 1450 ml a 50 ml sample, pH 1.3, had some $Ca^{++}$.

At this point the resin was removed from the column, suspended in treated (i.e., low $Ca^{++}$) brine, neutralized to pH 8 with caustic then returned to the column. A 4% volume decrease in the resin had occurred. Some 600 ml of raw brine containing 681 ppm $Ca^{++} + Mg^{++}$ was passed through before $Ca^{++}$ started to increase above 7 ppm.

A third regeneration of the resin was carried out by passing 225 ml 1N HCl at 10 ml/min., then 150 ml 0.1N HCl through the resin in the column. The resin was then removed and batch neutralized with caustic to pH 11. The regenerated resin was then returned to the column and raw brine (i.e., 26% NaCl with 681 ppm $Ca^{++}$) was pumped through at 50° C. and 10 ml/min. The following table illustrates the data obtained and confirms that the conditions of the last regeneration are the preferred conditions.

TABLE I

| Volume Out | pH of Effluent | ppm Ca + Mg (Versene Titration) |
| --- | --- | --- |
| 100 ml | 8 | 0 |
| 250 ml | 7 | 0 |
| 400 ml | 7 | 0 |
| 600 ml | 6.5 | 0 |
| 800 ml | 6 | 0 |
| 1100 ml | 6 | 0 |
| 1300 ml | 6 | 0 |
| 1450 ml | 6 | 1 |
| 1650 ml | 6 | 8.8 |

We claim:

1. A method for substantially removing alkaline earth metal ions from a NaCl brine feed to an electrolytic cell wherein NaCl is electrolyzed to produce chlorine and sodium hydroxide, said method comprising
   passing said NaCl brine through a vessel containing a particulate, macroporous, anion exchange resin composite containing therein the post-deposited in-situ reaction product of polymeric amorphous hydrous zirconium oxide and a source of $PO_4^{---}$ ions,
   removing from contact with said composite in said vessel, the NaCl brine with its alkaline earth metal ions being substantially removed, and
   thereafter feeding said NaCl brine to the said electrolytic cell.

2. The method of claim 1 wherein the alkaline earth metal ions comprise $Mg^{++}$ and/or $Ca^{++}$.

3. The method of claim 1 wherein the resin of the composite comprises an anion exchange resin of styrene crosslinked with divinylbenzene and having amine groups attached thereto.

4. The method of claim 1 wherein the source of $PO_4^{---}$ ion comprises $H_3PO_4$.

5. The method of claim 1 wherein the resin of the composite comprises a particulate, macroporous polymer of styrene crosslinked with divinylbenzene and having tertiary amine groups attached thereto.

6. The method of claim 1 wherein the pH of the brine is in the range of about 5 to about 8.5.

7. The method of claim 1, using a brine having a temperature in the range of about 20° C. to about 100° C.

8. The method of claim 1, using a brine having a temperature in the range of about 50° C. to about 60° C.

9. The method of claim 1 wherein the contacting of the brine with the resin composite is performed in a column containing 1 bed volume of the resin and where the brine is flowed through the bed at the rate of about 0.001 to about 0.2 bed volumes per minute.

10. The method of claim 1 wherein the flow rate of the brine through the bed is about 0.01 to about 0.08 bed volumes per minute.

11. The method of claim 1 wherein the resin of the composite comprises an anion exchange resin of styrene crosslinked with divinylbenzene and having amine groups attached thereto.

12. A method for determining the presence of $Mg^{++}$ and/or $Ca^{++}$ ions in an alkali metal brine solution, said method comprising passing said alkali metal brine solution through a column packed with a particulate, macroporous anion exchange resin composite containing therein the in-situ reaction product of polymeric amorphous hydrous zirconium oxide and source of $PO_4^{---}$ ions, removing the said brine from said column, and analyzing the said resin for $Mg^{++}$ and/or $Ca^{++}$ ions by dissolving said ions from the resin and determining the amount of said ions in the solute.

13. The method of claim 12 wherein the source of $PO_4^{---}$ ion comprises $H_3PO_4$.

14. The method of claim 12 wherein the resin of the composite comprises a particulate, macroporous polymer of styrene crosslinked with divinylbenzene and having tertiary amine groups attached thereto.

15. The method of claim 12 wherein the pH of the brine is in the range of about 5 to about 8.5.

16. The method of claim 12, using a brine having a temperature in the range of about 20° C. to about 100° C.

17. The method of claim 12, using a brine having a temperature in the range of about 50° C. to about 60° C.

18. The method of claim 12 wherein the contacting of the brine with the resin composite is performed in a column containing 1 bed volume of the resin and where the brine is flowed through the bed at the rate of about 0.001 to about 0.2 bed volumes per minute.

19. The method of claim 12 wherein the flow rate of the brine through the bed is about 0.01 to about 0.08 bed volumes per minute.

* * * * *

UNITED STATES PATENT AND TRADEMARK OFFICE
CERTIFICATE OF CORRECTION

PATENT NO. : 4,522,951
DATED : June 11, 1985
INVENTOR(S) : John M. Lee et al.

It is certified that error appears in the above—identified patent and that said Letters Patent is hereby corrected as shown below:

In the title, "MG$^{++}$" should be --Mg$^{++}$-- and "CA$^{++}$" should be --Ca$^{++}$--.

Front page, last line reads "PO$_4$---"; should read --PO$_4^=$--.

Each occurrence of "PO$_4$---" should read --PO$_4^=$--.

Col. 1, line 13; reads "These"; should read --There--.

Col. 3, line 16; remove "0" after "Mg$^{++}$".

Col. 5, line 12; add --a-- after "and".

Signed and Sealed this

Seventeenth Day of December 1985

[SEAL]

Attest:

DONALD J. QUIGG

Attesting Officer

Commissioner of Patents and Trademarks